2,546,425

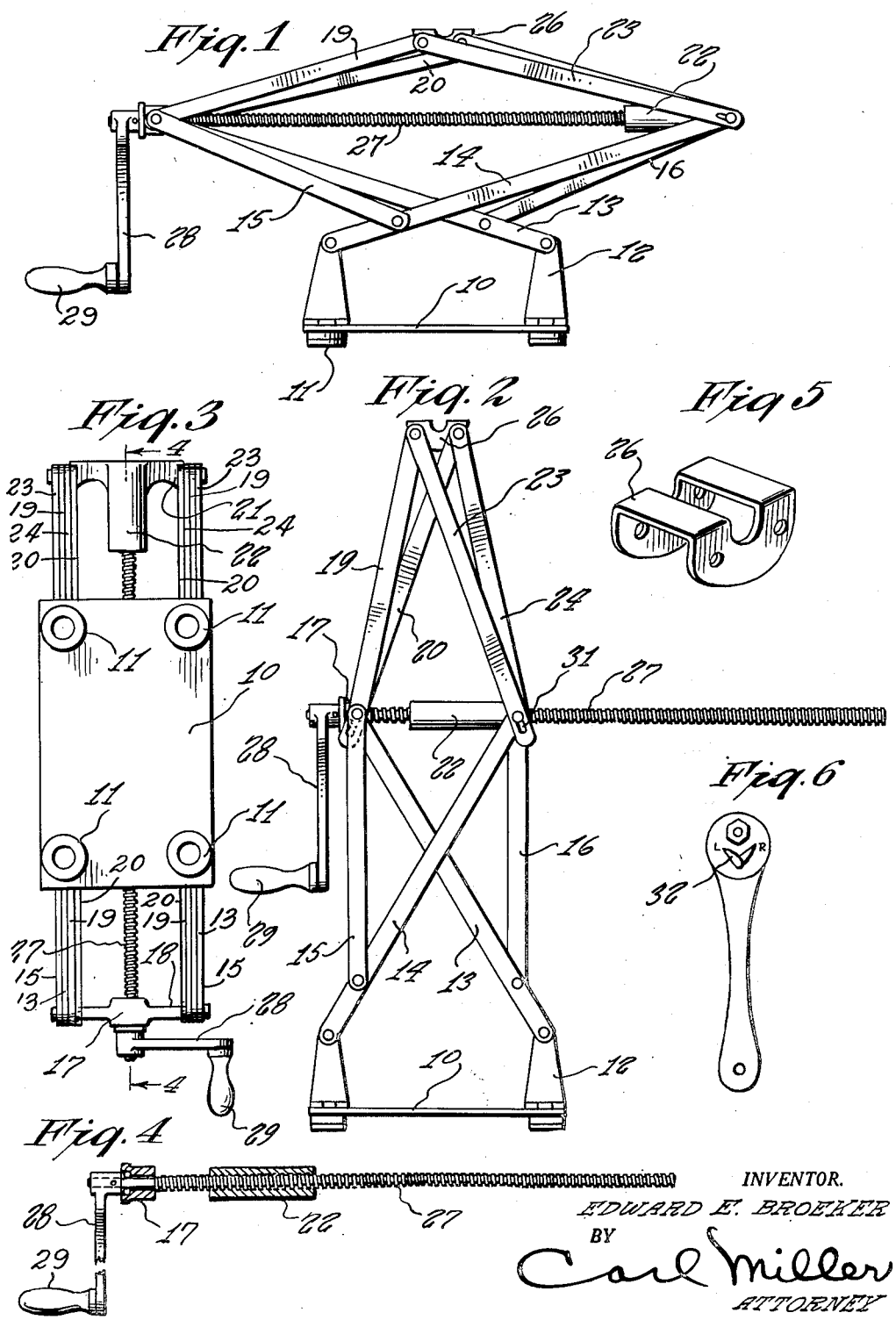
March 27, 1951     E. E. BROEKER     2,546,425
SCISSOR-TYPE BUMPER JACK
Filed Jan. 18, 1949
INVENTOR.
EDWARD E. BROEKER
BY Carl Miller
ATTORNEY Patented Mar. 27, 1951

UNITED STATES PATENT OFFICE 2,546,425

SCISSOR-TYPE BUMPER JACK

Edward E. Broeker, North Tonawanda, N. Y.

Application January 18, 1949, Serial No. 71,409

1 Claim. (Cl. 254—126)

This invention relates to a scissor-type bumper jack.

It is an object of the present invention to provide a jack adapted to be inserted under a bumper of an automobile to raise one end of the automobile wherein the operation of the jack can be effected by a handle projecting to a convenient location where it can be easily and readily turned.

Other objects of the present invention are to provide a scissor-type automobile jack which is of simple construction, easy to locate under the bumper of the automobile, inexpensive to manufacture, easy to operate and adjust, adapted to be in compact state, and efficient in operation.

For other objects and for a better understanding of the invention, reference may be had to the following detailed description taken in connection with the accompanying drawing, in which Fig. 1 is a side elevational view of the jack with the parts collapsed and lowered.

Fig. 2 is a side elevational view of the jack with the parts elevated and extended.

Fig. 3 is a bottom plan view of the jack.

Fig. 4 is a sectional view of the jack as viewed on line 4—4 of Fig. 3.

Fig. 5 is a perspective view of the bumper cradle.

Fig. 6 is a modified form of crank utilizing a ratchet member so that the crank can be retained in the position to which it has been adjusted.

Referring now to the figures, 10 represents a base having feet portions 11 disposed at the four corner locations on the base and depending therefrom. These feet portions are adapted to be located on the ground beneath the bumper of an automobile. Extending upwardly from the plate are bracket projections 12 to which links 13 and 14 are connected. To these links are connected links 15. The links 13, 14 and 15 extend upwardly. Connected to the upper ends of links 13 and 15 is a ring member 17 which has lateral extensions 18 for receiving the links. These extensions also receive upper links 19 and 20.

The bottom links 14 and 16 extend upwardly and are connected to lateral extensions 21 of an internally threaded member 22. Members 23 and 24 are also pivotally connected to the lateral extensions 21. A bumper cradle is connected to the upper ends of links 19, 20, 23 and 24 as indicated at 26. This cradle is adapted to be seated under a bumper. A threaded operating shaft 27 is coupled to the internally threaded member 22 and as the shaft is rotated by a crank 28 having a handle 29, the links can be elevated or lowered. The links 20 and 23 have elongated slots 31 in order to prevent the links from binding at their connections with the members 17 and 22.

As shown in Fig. 6, a handle with a ratchet arrangement 32 may be used in order that the handle can be supported at the desired position to which it has been turned.

While various changes may be made in the detail construction, it shall be understood that such changes shall be within the spirit and scope of the present invention as defined by the appended claim.

Having thus set forth and disclosed the nature of my invention, what is claimed is:

A scissors jack comprising a base member, a cradle top member, a linkage connecting said members, a screw shaft, a pair of laterally spaced cross elements disposed on said screw shaft and one of said cross elements being adapted to be moved in axial direction on said shaft upon rotation thereof, said linkage comprising a lower pair of first links having their lower ends pivoted to said base member and crossing each other, upper ends of said first links pivoted to said cross elements, and a pair of second links each pivoted at its lower end to an intermediate portion of one of said crossed first links and pivoted at its upper end to a cross element adjacent the upper end of the other of said crossed first links, and said linkage comprising additionally two pairs of upper links, each link of said last mentioned pairs of upper links pivoted to the corresponding cross element at their lower ends, and to spaced apart points of said cradle top member at their upper ends, said last mentioned pairs of links having longitudinal slots at their lower ends, thereby moving the pivot points in order to retain the screw shaft in substantially horizontal position, and a crank disposed at one end of said screw shaft for operation thereof.

EDWARD E. BROEKER.

REFERENCES CITED

The following references are of record in the file of this patent:

UNITED STATES PATENTS

| Number | Name | Date |
|--------|------|------|
| 1,526,767 | Benjamins | Feb. 17, 1925 |
| 2,467,657 | Brown | Apr. 19, 1949 |